United States Patent
Taguchi et al.

(10) Patent No.: US 7,336,234 B2
(45) Date of Patent: Feb. 26, 2008

(54) ANTENNA APPARATUS AND COMMUNICATION METHOD EMPLOYING IT

(75) Inventors: Yutaka Taguchi, Toyota (JP); Hideki Kusunoki, Nishikamo-gun (JP); Toshiyasu Tanaka, Zama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/315,174

(22) Filed: Dec. 23, 2005

(65) Prior Publication Data
US 2006/0139225 A1  Jun. 29, 2006

(30) Foreign Application Priority Data
Dec. 28, 2004 (JP) ............................ 2004-381349

(51) Int. Cl.
*H01Q 13/00* (2006.01)
(52) U.S. Cl. ...................................... 343/773; 343/713

(58) Field of Classification Search ................ 343/711, 343/712, 713, 773, 846, 715, 704
See application file for complete search history.

(56) References Cited

U.S. PATENT DOCUMENTS

| | | | |
|---|---|---|---|
| 3,950,726 A * | 4/1976 | Fujikawa et al. ............ 340/447 |
| 5,717,135 A * | 2/1998 | Fiorletta et al. ............ 73/146.5 |
| 6,020,854 A * | 2/2000 | Jagnow et al. .............. 343/705 |
| 6,642,899 B2 | 11/2003 | Strickland et al. | |
| 7,006,047 B2 * | 2/2006 | Marsan et al. .............. 343/705 |
| 7,027,004 B2 * | 4/2006 | Haunberger et al. ........ 343/790 |
| 2005/0156804 A1 * | 7/2005 | Ratni et al. ................. 343/773 |
| 2005/0258952 A1 * | 11/2005 | Utter et al. ................. 340/447 |

FOREIGN PATENT DOCUMENTS

| | | |
|---|---|---|
| DE | 692 19 728 T2 | 11/1997 |
| DE | 103 59 605 A1 | 7/2005 |
| JP | A 8-162842 | 6/1996 |
| JP | A 8-189957 | 7/1996 |
| JP | 2004-260336 | 9/2004 |

* cited by examiner

*Primary Examiner*—Tho Phan
(74) *Attorney, Agent, or Firm*—Oliff & Berridge, PLC

(57) ABSTRACT

An antenna apparatus includes a monopole antenna forming an antenna element having a metal shell body, and the antenna element has an approximately conical part, a vertex of which is on the side of a power supply part.

8 Claims, 7 Drawing Sheets

(A) RECEIVED LEVEL (B) RECEIVED LEVEL PRIOR ART

FIG.9

ANTENNA APPARATUS AND COMMUNICATION METHOD EMPLOYING IT

BACKGROUND OF THE INVENTION

1. Field of the Invention

The present invention relates to an antenna apparatus transmitting and/or receiving radio waves, for example, a transmitting antenna apparatus for providing a trigger to a transmitting apparatus (transmitter) mounted on a wheel triggering the transmitting apparatus to cause it to transmit an ID number of a tire having the transmitting apparatus mounted therein and various types of tire information including an air pressure of the tire, and to a communication method employing it.

2. Description of the Related Art

Recently, a monitoring system for monitoring a state of a tire (typically, an air pressure of the tire) upon running has been proposed. This monitoring system includes a transmitter mounted in each wheel as well as an on-vehicle monitoring apparatus including a receiver provided in a vehicle cabin. The on-vehicle monitoring apparatus receives, via the receiver, various types of tire information including an air pressure of the tire transmitted from the transmitter. Then, based on the various types of tire information, the on-vehicle monitoring apparatus provides various types of information to a driver, if necessary, i.e., an alarm, for example, a message 'an air pressure of front-left wheel lowers'.

SUMMARY OF THE INVENTION

In order to achieve the above-mentioned monitoring system, an ID number of each transmitter should be previously registered in the on-vehicle monitoring apparatus for the on-vehicle monitoring apparatus to identify which wheel corresponds to the tire information currently transmitted from the transmitter mounted in the wheel. For this purpose, in an appropriate process in a manufacturing line of a vehicle, processing of taking an ID number or such from the transmitter provided in the wheel, with the use of an antenna apparatus set in the manufacturing line, is carried out. Specifically, when radio waves are transmitted to the transmitter provided in the wheel from the antenna apparatus, the transmitter in the wheel responds thereto (i.e., it is triggered) for transmitting the ID number or such which the transmitter itself holds. This processing is carried out for each wheel, and finally, correspondence relationship between the respective wheels and the respective transmitters (ID numbers) is registered in the on-vehicle monitoring apparatus.

As mentioned above, processing of triggering the transmitter from the antenna apparatus is carried out for each wheel. There, if a transmitter of another wheel is erroneously triggered or a target transmitter is not triggered although the antenna apparatus transmits radio waves so as to trigger the target transmitter of one wheel, the processing may be delayed, or, finally, the correspondence relationship between the respective wheels and the respective transmitters (ID numbers) thus obtained may not be a reliable one. Especially, a circumferential position of the transmitter, currently being triggered, is not fixed when the transmitter is provided in the tire. Therefore, there may be a case where a desired tire may not be properly triggered when radio emission characteristics of the antenna apparatus are not uniform in the circumferential direction.

The present invention has been devised in consideration of this problem, and an object of the present invention is to provide an antenna apparatus suitable for achieving positively carrying out communication with a target communication apparatus, and a communication method employing it.

According to one aspect of the present invention, an antenna apparatus is provided, made of a monopole antenna forming an antenna element by a metal shell body, the antenna element has an approximately conical part, a vertex of which is on the side of a power supply part.

The antenna apparatus in this aspect may further include a capacitative member at a head part of the antenna element located on a side opposite to said side of the power supply part.

The antenna apparatus in this aspect may further include a reflecting plate covering and shielding the power supply part side of the antenna element. The antenna element may have a part in which an outer diameter is reduced on a bottom side of the conical part.

According to another aspect of the present invention, an antenna apparatus is provided, made of a monopole antenna forming an antenna element by a metal shell body, and the antenna element has a rotationally symmetrical shape, and has a part having a radius different along the axis of the rotationally symmetrical shape.

The antenna apparatus in this aspect may be one transmitting radio waves to trigger a predetermined transmitting operation of a transmitter mounted in an underbody part of a vehicle. In this case, the transmitter may be mounted in a wheel, and the predetermined transmitting operation may be an operation of transmitting an ID number of the transmitter. Further, this operation may be an operation of transmitting various types of tire information including an air pressure of a tire having the transmitter mounted therein.

The antenna apparatus in this aspect may be disposed in a vehicle cabin for receiving radio waves from a transmitter mounted in a wheel. In this case, the transmitter may include respective transmitters mounted in respective wheels, and the antenna apparatus may be disposed at a position of a vehicle body roof part, equidistant from the respective wheels in such a manner that a head part of the antenna element faces vertically downward, so as to receive radio waves from the transmitters of the respective wheels.

According to further another aspect of the present invention, a communication method is provided to include the step of transmitting radio waves to a wheel side apparatus mounted in a wheel for changing an operation state of the wheel side apparatus, from the above-mentioned antenna apparatus, in a condition in which a central axis of the conical shape part of the antenna apparatus may be approximately coaxial with a central axis of the wheel.

According to the present invention, an antenna apparatus suitable for achieving positively carrying out communication with a target communication apparatus, and a communication method employing it, can be provided.

BRIEF DESCRIPTION OF DRAWINGS

Other objects and further features of the present invention will become more apparent from the following detailed description when read in conjunction with the accompanying drawings:

FIGS. 6 (A) and (C) show radio emission characteristics of the antenna apparatus 10 in the present embodiment, and (B) shows radio emission characteristics of the antenna apparatus 10' in the related art;

FIG. 8 (A) shows polarization characteristics along a tire's circumferential direction of the antenna apparatus 10 in the present embodiment, and (B) shows the same polarization characteristics of the antenna apparatus 10' in the related art.

DETAILED DESCRIPTION OF THE PREFERRED EMBODIMENTS

With reference to figures, a best mode for carrying out the present invention is described.

Figure 1:
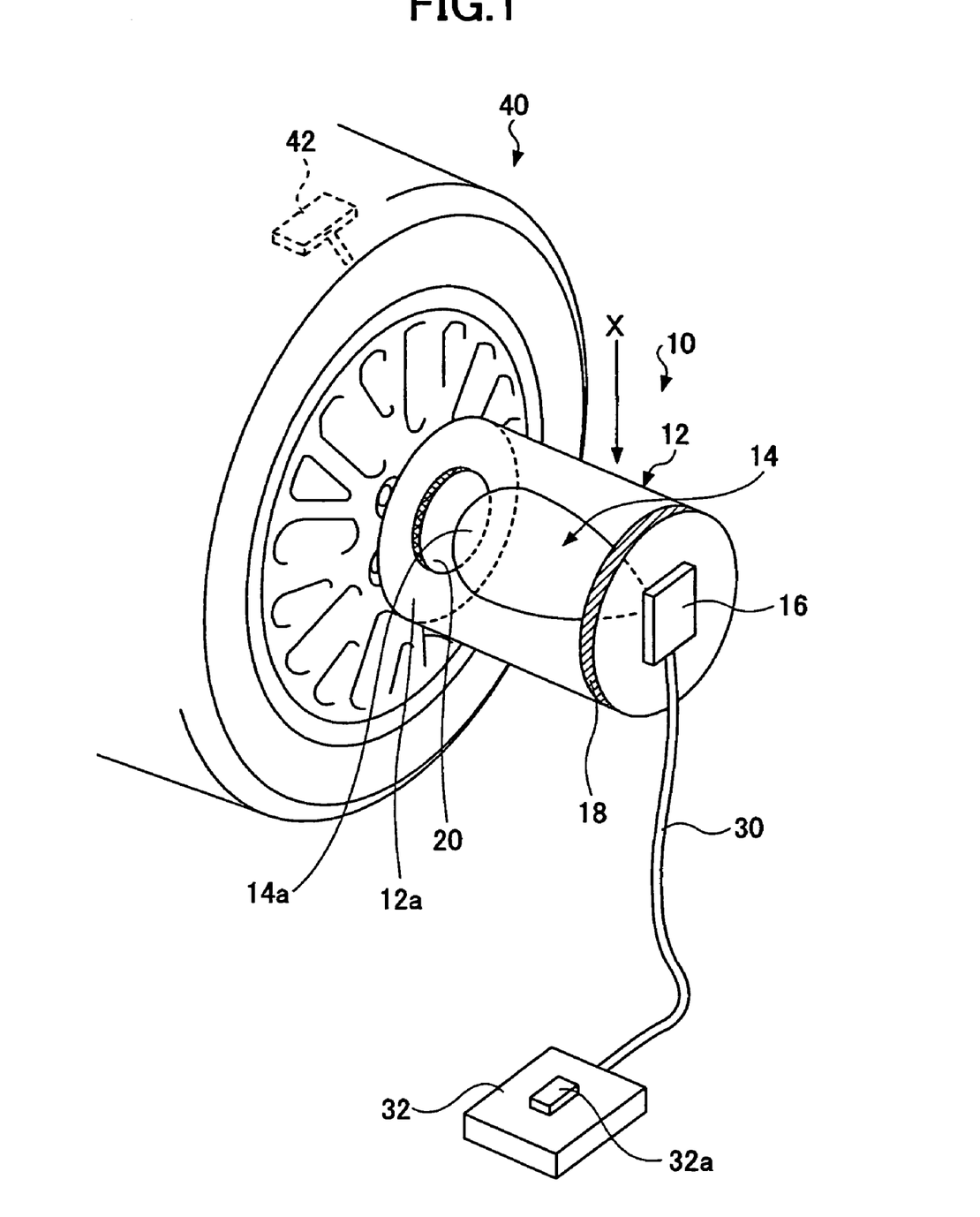
FIG. 1 shows a perspective view generally showing an operation state of one embodiment of an antenna apparatus according to the present invention.
Figure 2:
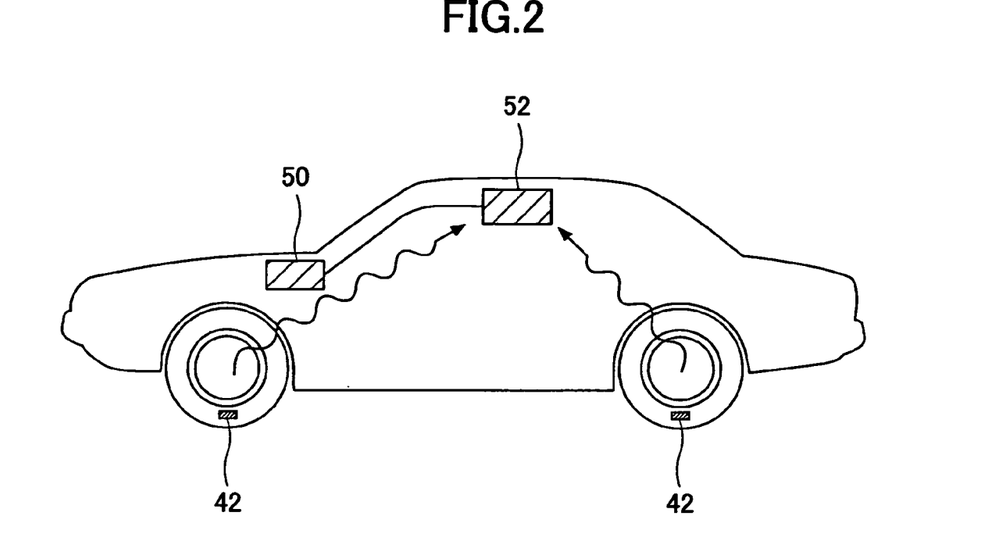
FIG. 2 shows a general view of a tire air pressure monitoring system.

FIG. 1 shows a perspective view generally showing an operation state of one embodiment of an antenna apparatus according to the present invention. FIG. 2 shows a general view of a monitoring system for monitoring a state (typically, an air pressure) of a tire upon running. It is noted that, hereinbelow, an embodiment, in which an antenna apparatus according to the present invention is applied as a tire air pressure monitoring system, will be mainly described. However, the present invention is not limited to such a system.

As shown in FIG. 1, the antenna apparatus 10 according to the present embodiment has an approximately cylindrical casing 12. In the casing 12, an antenna element 14 having an approximately conical shell is held. The antenna element 14 is made of a metal (for example, copper, brass, or such), and forms a monopole antenna. Details of a configuration of the antenna element 14 are described later.

A power supply part 16 for the antenna element 14 is provided at an end of the casing 12. The power supply part 16 is set at a head of the conical shape of the antenna element 14. To the power supply part 16, a controller 32 (roughly shown) controlling radio transmission of the antenna apparatus 10, is connected via a cable 30.

On an end of the antenna element 14 on the side of the power supply part 16, a reflecting plate 18 forming a ground plane is provided. The reflecting plate 18 shown in FIG. 1 is a circular plate member blocking a circular end opening of the casing 12. The reflecting plate 18 is made of, for example, aluminum. A capacity hat 20, made of a capacitative material, is provided at an end part 14a (head part 14a) of the antenna element 14 on the side opposite to the side of the power supply part 16. The capacity hat 20 may be a circular plate member blocking a circular end opening of the casing 12. Alternatively, the capacity hat 20 may be a member other than a circular end plate 12a of the casing 12. The capacity hat 20 is made of, for example, nickel-plated brass. Functions of these capacity hat 20 and reflecting plate 18 are described later in details.

As shown in FIG. 1, the end plate 12a of the casing 12 is fixed and set, by a jig or such (not shown), to a vehicle manufacturing line in such a manner that the end plate 12a has a height/position corresponding to a disk surface of a wheel 40 of a vehicle. That is, the antenna apparatus 10 is fixed/set in such a manner that the head part 14a thereof faces a wheel center of the wheel 40 of the vehicle. As a result, when the wheel 40 of the vehicle which flows through the manufacturing line comes to a predetermined position facing the antenna apparatus 10, a central axis (see FIG. 3) of the antenna element 14 becomes approximately aligned with the wheel central axis (i.e., an alignment is established).

When the wheel 40 of the vehicle flowing through the manufacturing line is thus set in the predetermined position, radio waves are radiated from the antenna apparatus 20 as a result of a switch 32a of the controller 32 being pressed by an operator or automatically. When the radio waves are thus radiated by the antenna apparatus 10, a transmitter 42, mounted in the wheel 40, is triggered, whereby tire information is transmitted from the transmitter 42. The tire information may include an ID number (i.e., an ID number of the tire in which the transmitter 42 is mounted) of the transmitter 42, as well as other information useful for an inspection of the tire, checking characteristics of the same, such as an air pressure, a temperature or such, of the tire in which the transmitter 42 is mounted. The information such as an air pressure, a temperature or such or the tire is obtained via a sensor (which may be built-in in the transmitter 42) provided in the tire.

The transmitter 42 mounted in the wheel 40 may be one operated by a battery, and, is designed to store data of the air pressure, temperature or such, detected by the sensor, and transmit the above-mentioned tire information, in response to radio waves from the antenna apparatus 10. The transmitter 42 is set in an appropriate position of the wheel (including the tire) 40, and, may be mounted to a wheel rim of the wheel 40, integrally with a valve thereof, for example.

The tire information thus transmitted from the transmitter 42 in response to a trigger from the antenna apparatus 10 is received by the antenna apparatus 10 itself, or by an on-vehicle monitoring apparatus (ECU) 50 (see FIG. 2) via a receiver 52 (antenna). After the tire information is thus received properly, the vehicle is moved, and the same processing is carried out on a wheel 40 of a subsequent vehicle flowing along the manufacturing line. The antenna apparatus 10 may be provided for each of respective wheels of the vehicle on the both right and left sides and/or both font and rear sides, and thus, may be provided for total four wheels of the vehicle. Thus, the antenna apparatuses 10 may be provided both right and left sides and/or both front and rear sides along the manufacturing line. In this case, a configuration should be provided such that, triggering of the respective transmitters of the respective wheels may be made intermittently, for allowing positive identification of the wheel 40 having the transmitter 42 currently transmitting the tire information.

After the tire information is thus obtained from all of the respective transmitters 42 of the respective wheels 40, correspondence relationship between the respective wheels 40 and the respective ID numbers can be fixed. This correspondence relationship is finally registered in a memory (for example, EEPROM) of the on-vehicle monitoring apparatus 50. In the above-mentioned configuration in which the tire information from the transmitter 42 is received by the receiver 52 of the on-vehicle monitoring apparatus 50 directly, the ID numbers are directly registered in the on-vehicle monitoring apparatus 50. On the other hand, in the configuration in which the tire information from the transmitter 52 is once received by the antenna apparatus 10, the ID numbers can be registered in the on-vehicle monitoring apparatus 50 as a result of the on-vehicle monitoring apparatus 50 being connected with the antenna apparatus 10 via wire, and the above-mentioned corresponding relationship information being transmitted to the on-vehicle monitoring apparatus 50 from the antenna apparatus 10. The tire information thus collected through the triggering operation at least includes the ID number for a case where the ID number registration mentioned above is the purpose of the tire information collection. On the other hand, for the purpose of tire inspection before shipment of the vehicle (for example, immediately before line off), various types information, other than the ID number, such as a tire's air pressure, is included in the tire information to collect.

After the vehicle shipment, the transmitter 42 of each wheel 40 periodically transmits the tire information such as a tire's air pressure, the tire's temperature or such, to the on-vehicle monitoring apparatus 50. At this time, the on-vehicle monitoring apparatus 50 can grasp a tire condition of each wheel 40 periodically based on the correspondence relationship of the ID numbers of the wheels 40 registered as mentioned above. For example, when the on-vehicle monitoring apparatus 50 determines, based on the tire information (including the ID number) transmitted from the transmitter 42, that the tire's air pressure of the rear-right wheel for example is insufficient, the on-vehicle monitoring apparatus 50 generates an alarm in an acoustic form (for example, an alarm message) and/or a visual form (for example, an alarm lamp on a meter). Thereby, a driver can easily recognize a sudden change in the tire condition upon running, and can respond thereto appropriately.

Figure 3:
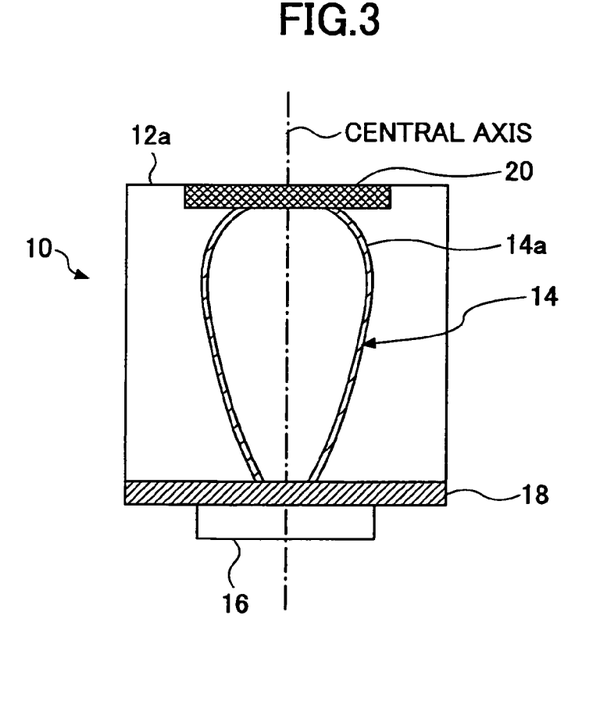
FIG. 3 shows a sectional view of an antenna apparatus 10 taken along a horizontal plane.
Figure 4:
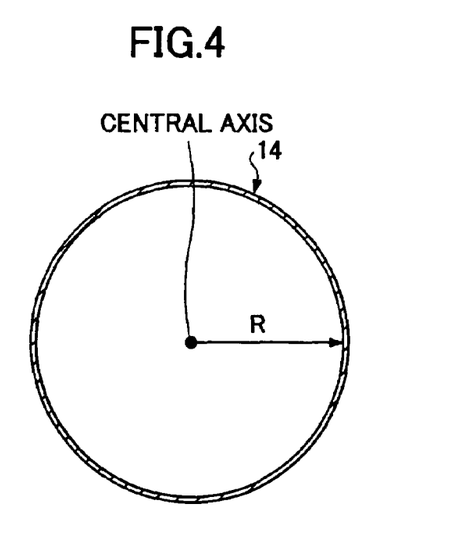
FIG. 4 shows a sectional view of an antenna element 14 taken along a verticals plane.

Next, a characteristic configuration of the antenna apparatus 10 in the embodiment of the present invention is described. FIG. 3 shows a sectional view of the antenna apparatus 10 viewed along a vertically downward direction X of FIG. 1, i.e., viewed along a radial direction of the cylindrical casing 12. FIG. 4 shows a sectional view of the antenna element 14 taken along a radial direction of the cylindrical casing 12, i.e., taken along a vertical plane parallel to the end plate 12*a*.

As shown in FIGS. 3 and 4, the antenna element 14 is made of a shell (metal shell) having a rotationally symmetrical shape (approximately conical shape). In the example shown in FIG. 3, the antenna element 14 is shaped such that the head part 14*a* of the antenna element 14, located on the side of the bottom of the conical shape part, reduces in its radius R (see FIG. 4), and is closed on the side of the capacity hat 20. That is, the antenna element 14 has a shape like a tear drop, or a shape like a tapering-off spherical lamp. In further detail, the radius R of the antenna element 14 gradually increases from the side of the power supply part 16, has a maximum value at a position further than the center thereof, and gradually reduces toward the side of the capacity hat 20.

Next, radio emission characteristics of the antenna apparatus 10 in the present embodiment are described in comparison to radio emission characteristics of an antenna element 10' in the related art.

Figure 5:
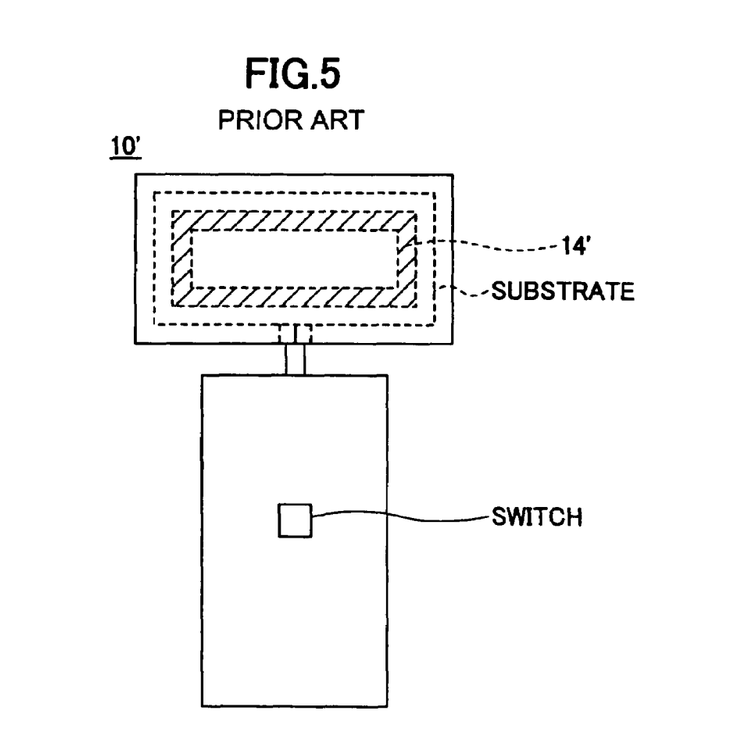
FIG. 5 shows a configuration of an antenna apparatus 10' in the related art.

FIG. 5 shows a configuration of the antenna apparatus 10' in the related art. The antenna apparatus 10' has an antenna element 14' forming a rectangular loop. The antenna apparatus 10' is held in such a manner that a loop plane of the antenna element 14' may lie along a disk plane of the wheel 40. That is, with respect to an orientation in an operation state of the antenna apparatus 10', a viewing direction of FIG. 5 corresponds to a direction perpendicular to the disk plane of the wheel 40, and thus, corresponds to the viewing direction of FIG. 4 in the antenna apparatus 10 of the present embodiment.

Figure 6:
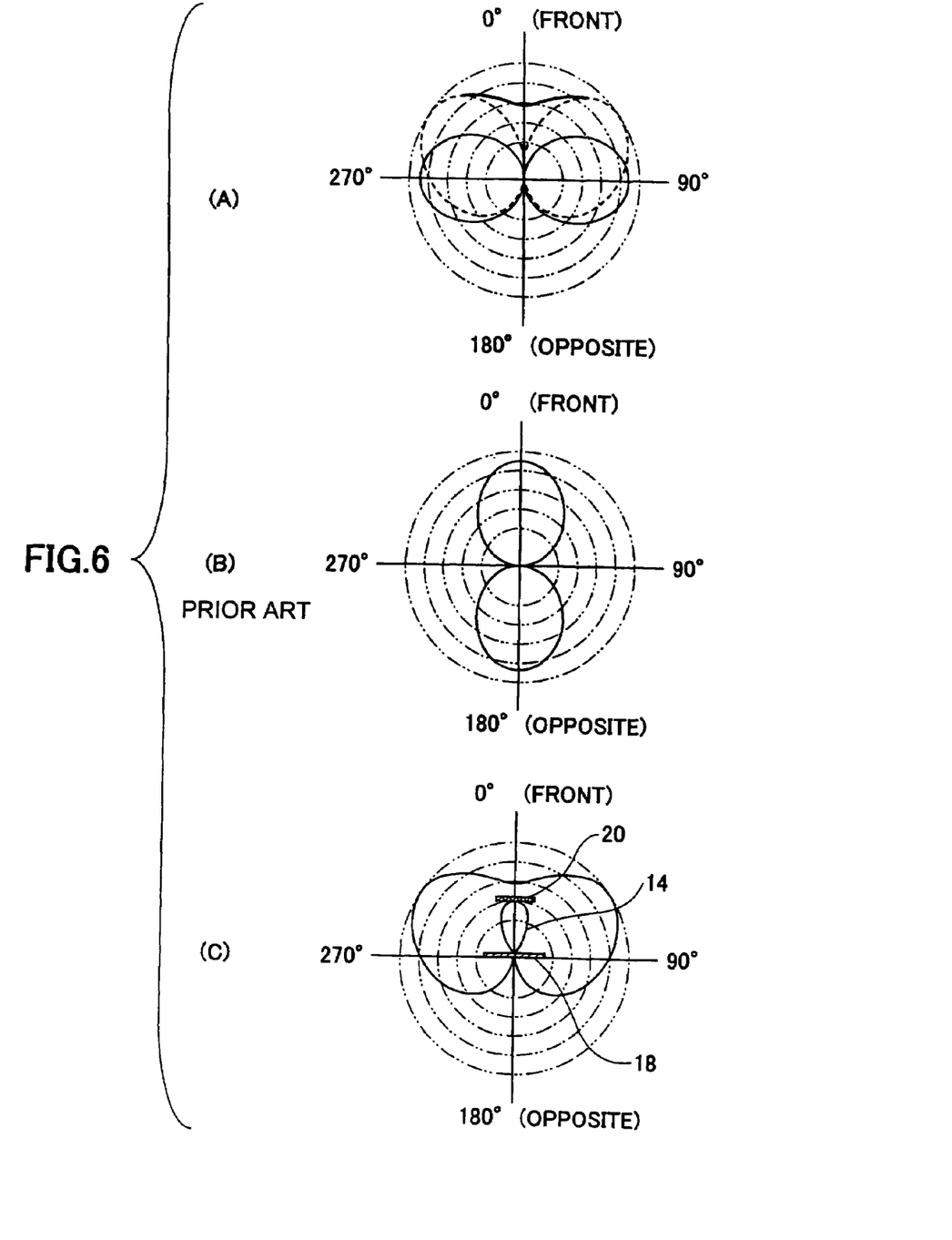
Figure 7:
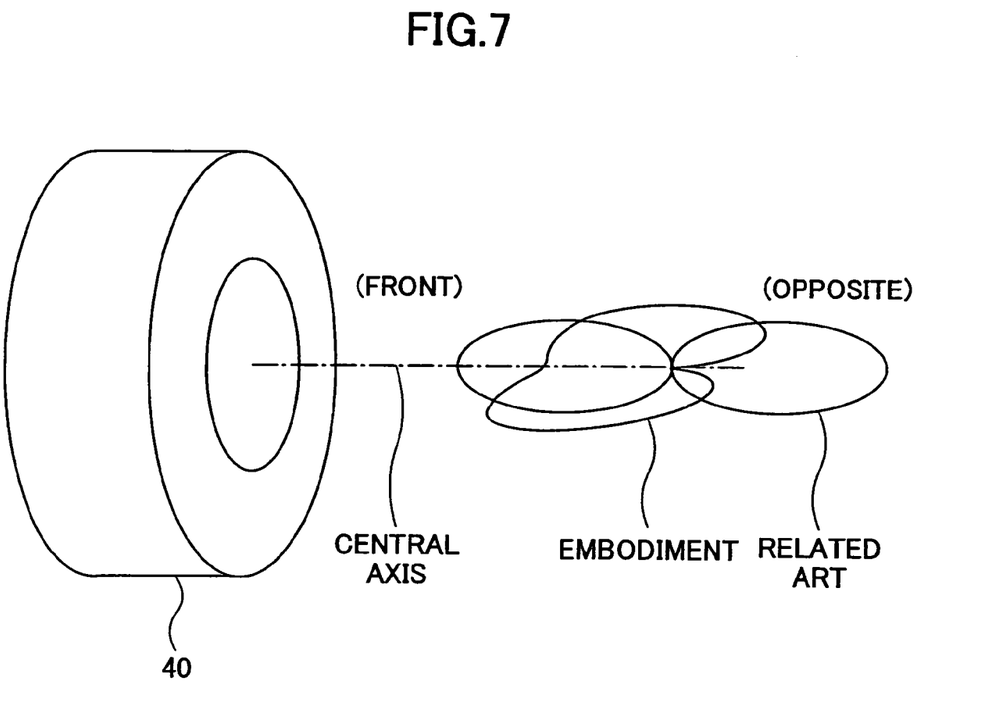
FIG. 7 shows a relationship of the radio wave characteristics in a horizontal plane with respect to a wheel 40.

FIG. 6 (A) shows radio emission characteristics of the antenna apparatus 10 in the embodiment of the present invention, while FIG. 6 (B) shows radio emission characteristics of the antenna apparatus 10' in the related art. FIG. 7 shows a relationship between these radio emission characteristics and the wheel 40.

As shown in FIG. 6, the antenna apparatus 10' in the related art has the radio emission characteristics such that two spherical zones are formed in a direction toward the tire (0° in the figure) and in an opposite direction (180° in the figure), as shown in FIG. 6 (B). In contrast thereto, the antenna apparatus 10 in the embodiment of the present invention has the radio emission characteristics such that two spherical zones are formed in a front and rear direction (90° and 270° in the figure) of the vehicle, as shown in FIG. 6 (A). As shown in FIG. 6 (A), the two spherical zone (solid line) radio emission characteristics are enhanced (broken line) in the direction toward the tire (0° in the figure) by a function of the reflecting plate 18, and further, are enhanced (bold line) in the direction toward the tire (0° in the figure) by a function of the capacity hat 20. Thereby, a depression between the two spherical zones (i.e., a depression in the vicinity of 0° in the figure) is corrected in the antenna apparatus 10 in the embodiment of the present invention. FIG. 6 (C) shows final radio emission characteristics of the antenna apparatus 10 in the embodiment of the present invention obtained from these functions of the capacity hat 20 and the reflecting plate 18. In FIG. 6 (C), for the purpose of showing a relationship between the radio emission characteristics and the antenna apparatus 10, the antenna apparatus 10 is roughly shown.

Thus, as also shown in FIG. 7, the radio emission characteristics of the antenna apparatus 10 in the embodiment of the present invention ('EMBODIMENT' in the figure) are enhanced totally in the direction toward the tire (front side), and also, its angular covering range increases. Accordingly, in the antenna apparatus in the embodiment of the present invention, communication characteristics for the transmitter 42 provided inside of the wheel 40 mentioned above remarkably improve, and thus, the above-mentioned triggering of the transmitter 42 can be easily achieved. Further, the radio emission characteristics of the antenna apparatus 10 in the embodiment of the present invention is weakened in the direction (180° in the figure) opposite to the direction toward the tire (opposite side) due to a function of the reflecting plate 18. As a result, triggering of the transmitter 42 included in the other wheel 40, for which triggering is not intended currently, can be effectively avoided. This feature is advantageous especially for such a line configuration that the antenna apparatuses 10 are arranged respectively in parallel to a plurality of manufacturing lines. This is because, in such a line configuration, if the antenna apparatus 10' in the related art is applied, the radio emission characteristics are large also in the opposite direction (180° in FIG. 6 (B)). As a result, the transmitter 42 included in the wheel 40 of a vehicle flowing in another manufacturing line, for which triggering is not intended currently, may be erroneously triggered.

Further, since the antenna element 14 of the antenna apparatus 10 in the embodiment of the present invention has the radius R continuously increasing, a resonance frequency range can be widened. As a result, a configuration the antenna element 14 should not be changed, for example, even when it is provided for the transmitter 42 having a different resonance frequency (approximately 315 MHz for USA; or approximately 434 MHz for Europe), the difference occurring due to a difference in the destination country.

Further, the antenna element 14 of the antenna apparatus 10 in the embodiment of the present invention has the radio emission characteristics enhanced through a wide angle on the side of the tire (front side), which are achieved approximately uniformly through out the entire circumference of the tire, thanks to the rotationally symmetrical shape of the antenna element 14. That is, the antenna apparatus 10 in the embodiment of the present invention has three-dimensional radio emission characteristics such as that obtained from rotating the radio emission characteristics of FIG. 6 (C) about a line lying between 0° and 180° of FIG. 6 (i.e., the central axis of the antenna element 14).

Figure 8:
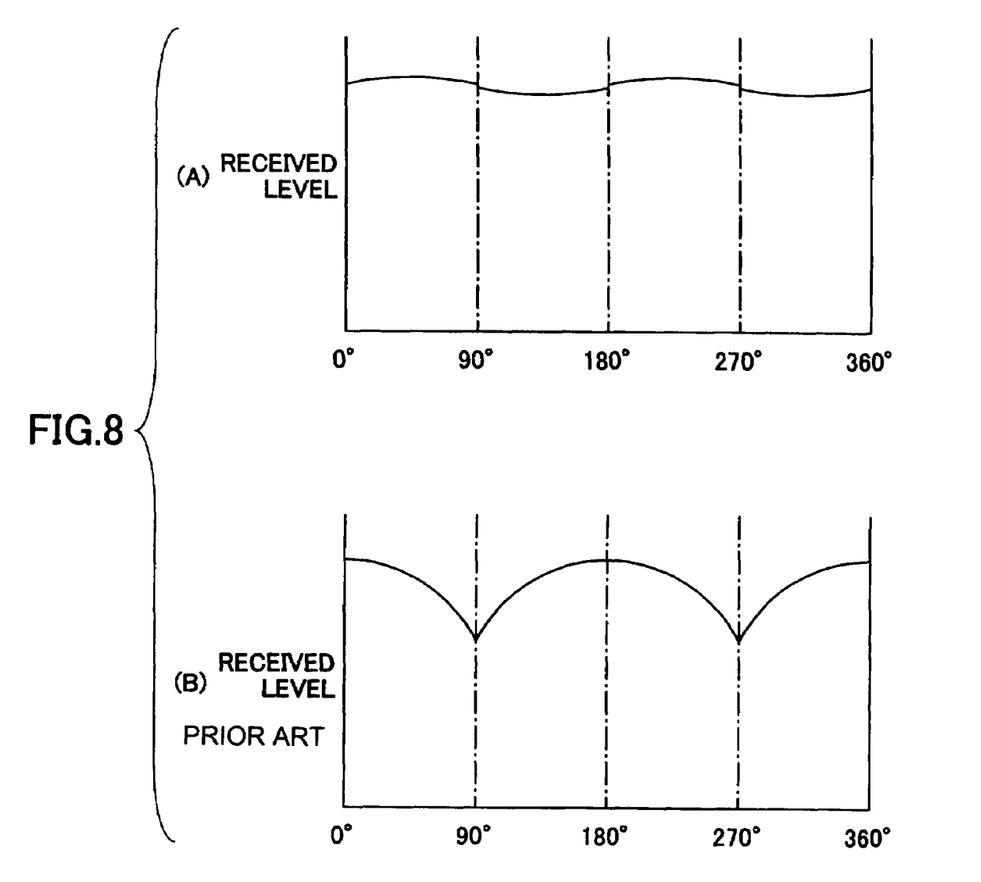

FIG. 8 (A) shows polarization characteristics of the antenna apparatus 10 in the embodiment of the present invention along a circumferential direction. FIG. 8 (B) shows the same polarization characteristics of the antenna apparatus 10' in the related art. These are obtained from evaluation of reception sensitivity in the transmitter 42 at a position at which it is mounted inside of the wheel 40, for each angular position obtained when the wheel 40 is rotated 360°. Angle values shown in FIG. 8 are those in the circumferential direction of the wheel 40, and thus, are different from those of FIG. 6.

As shown in FIG. 8, the antenna apparatus 10' in the related art has null points (i.e., points at which reception sensitivity falls remarkably, i.e., 90° and 270° in FIG. 8 (B)) locally along the circumferential direction of the wheel 40. In contrast thereto, the antenna apparatus 10 for each angular position does not have such null points, and has approximately uniform polarization characteristics along the tire's circumferential direction. Thus, in the antenna apparatus 10 for each angular position for each angular position, the reception sensitivity (as a result, the transmitter 42 triggering capability) is not much different with respect to a circumferential position of the transmitter 42 in the wheel 40, i.e., with respect to the relative angular position of the transmitter 42 with respect to the antenna apparatus 10. As a result, by applying the antenna apparatus 10 in the embodiment of the present invention, communication to, i.e., triggering of the transmitter 42, located at each of various rotational angular positions in the wheels of vehicles, successively flowing through the manufacturing line, can be carried out stably.

It is noted that, in the above-described embodiment, communication is made to the transmitter 42 provided inside of the tire. However, the same concept as that of the embodiment of the present invention may also be applied to any other transmitter/receiver which requires communication for the purpose of ID registration, inspection or another use, in the same manner. Especially, directivity of the antenna apparatus 10 in the embodiment of the present invention, enhanced in the front direction as mentioned above, may be applied effectively for a transmitter/receiver mountable in an underbody part (for example, a suspension, a shock absorber or such) of a vehicle.

Further, as described above, the antenna apparatus 10 in the embodiment of the present invention has the directivity enhanced on one side and also uniform through a wide angle range on the same side. Accordingly, there is a possibility of a wide variety of application of the embodiment of the present invention, without limiting a use or a portion for which it is applied. Especially for a vehicle, a receiver and/or a transmitter having such directivity may be effectively applied.

For example, the antenna apparatus 10 in the embodiment of the present invention may be applied as the receiver 52 of the on-vehicle monitoring apparatus 50 shown in FIG. 1. That is, the antenna apparatus 10 may be disposed in a vehicle cabin in such a manner as to receive the tire information periodically transmitted from the transmitter of each wheel 40 as mentioned above. In this case, the antenna apparatus 10 should be preferably disposed at a position of a vehicle body roof part equidistant from the respective wheels 40 in such a manner that the head part 14a of the antenna element 14 faces vertically downward, so that radio waves from the respective transmitters 42 can be positively received by the single antenna apparatus 10. In this case, the central axis of the antenna element 14 is thus made coincident with the vertical direction, and the three-dimensional radio emission characteristics such as that obtained from rotating the radio emission characteristics of FIG. 6 (C) are achieved in a vertically downward direction from the vehicle body roof part. As a result, not only communication with the transmitter 42 of each wheel 40, but also communication with another communication apparatus provided inside of the vehicle cabin may be carried out.

As to the triggering operation, the antenna apparatus 10 may be applied for the purpose of triggering an apparatus at least having a receiving function (or various types of apparatuses connected therewith) on the side of a vehicle for causing it to carry out a predetermined operation or for causing it to stop carrying out a predetermined operation. That is, the antenna apparatus 10 in the embodiment of the present invention may be applied wide for the purpose of changing a state of each of various types of apparatuses mounted on the side of a vehicle.

Further, the present invention is not limited to the above-described embodiment, and variations and modifications may be made without departing from the basic concept of the present invention claimed below.

Figure 9:
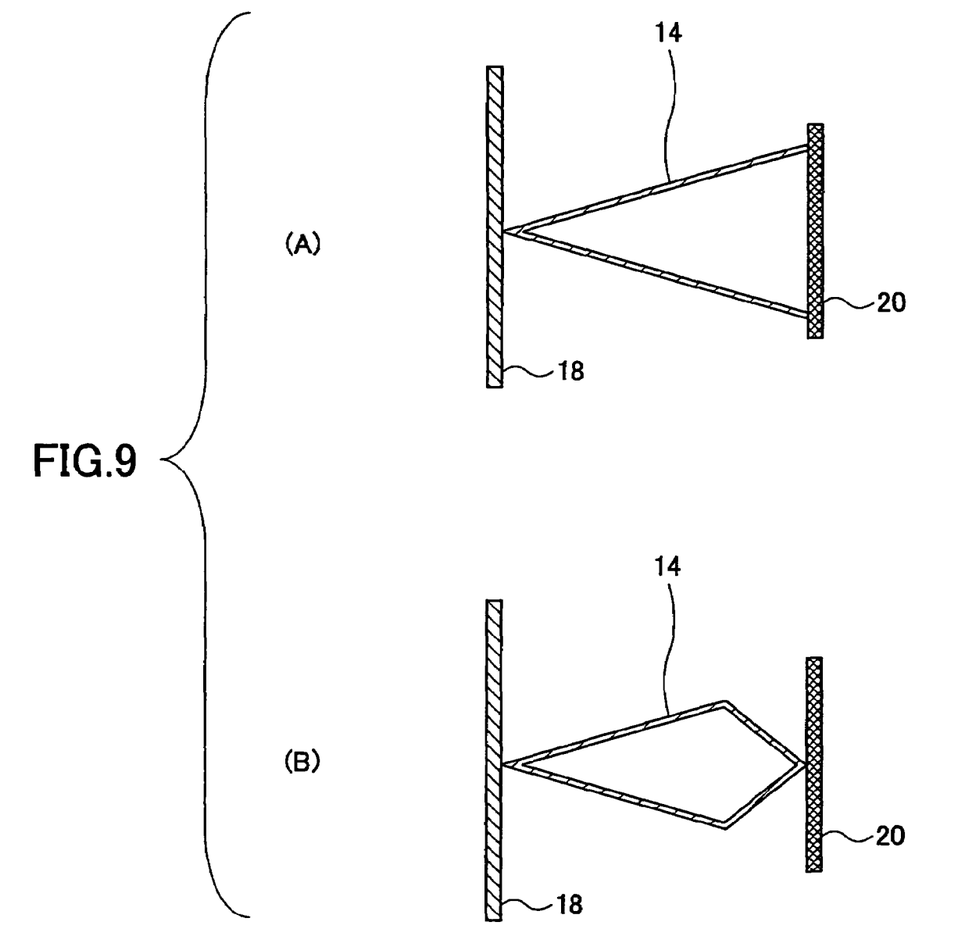
FIG. 9 shows a sectional view corresponding to FIG. 3 showing antenna apparatuses 10 in variant embodiments.

For example, in the above-described embodiment, the antenna element 14 is configured such that the outer diameter of the head part 14a reduces and is coupled with the capacity hat 20. However, as shown in FIG. 9 (A), the antenna element 14 may not have such a part reducing its outer diameter, but may have a hollow shell body only including a conical part. Further alternatively, as shown in FIG. 9 (B), the antenna element 14 may have a hollow shell body shaped like a combination of two conical parts.

Further, in the above-described embodiment, a vertical sectional shape of the antenna element 14 should not necessarily be a circular ring shape as shown in FIG. 4. Instead, an elliptic or polygonal ring shape may be applied. Further, the antenna element 14 should not necessarily be a rotationally symmetrical shape, but may have an asymmetrical shape.

Further, in the above-described embodiment, as the preferable embodiment, both the capacity hat 20 and the reflecting plate 18 are provided for example. However, they may be omitted. It is noted that when the capacity hat 20 is provided, the antenna element 14 and the capacity hat 20 may be produced integrally in a unit body.

The present application is based on Japanese priority application No. 2004-381349, filed on Dec. 28, 2004, the entire contents of which are hereby incorporated herein by reference.

What is claimed is:

1. An antenna apparatus comprising:
   a monopole antenna forming an antenna element having a metal shell body,
   a reflecting plate disposed between a power supply part and the antenna element and not connected to the antenna element such that the reflecting plate covers and shields the power supply part side of the antenna element, wherein:

said antenna element has an approximately conical part, a vertex of which is on the side of a power supply part;

said antenna apparatus is disposed in a vehicle cabin for receiving radio waves from a transmitter mounted in a wheel;

said transmitter comprises respective transmitters mounted in respective wheels; and said antenna apparatus is disposed at a position of a vehicle body roof part approximately equidistant from the respective wheels in such a manner that a head part of the antenna element faces vertically downward.

2. The antenna apparatus as claimed in claim 1, transmitting radio waves to trigger a predetermined transmitting operation to a transmitter mounted in an underbody part of a vehicle.

3. The antenna apparatus as claimed in claim 2, wherein: said transmitter is mounted in a wheel, and said predetermined transmitting operation comprises an operation of transmitting an ID number of said transmitter.

4. A communication method, comprising the step of:

transmitting radio waves to a wheel side apparatus mounted in a wheel from the antenna apparatus claimed in claim 1 for changing an operation state of the wheel side apparatus, in a state in which a central axis of the conical shape part of said antenna apparatus may be approximately coaxial with a central axis of the wheel.

5. An antenna apparatus comprising;

a monopole antenna forming an antenna element having a metal shell body, and a capacitative member at a head part of the antenna element located on a side opposite to said power supply part side, wherein:

said antenna element has an approximately conical part, a vertex of which is on the side of a power supply part, and said capacitative member is a flat plate; and said antenna apparatus is disposed in a vehicle cabin for receiving radio waves from a transmitter mounted in a wheel.

6. An antenna apparatus comprising;

a monopole antenna forming an antenna element having a metal shell body, and a reflecting plate disposed between a power supply part and the antenna element and not connected to the antenna element such that the reflecting plate covers and shields the power supply part side of the antenna element; wherein:

said antenna element has a rotationally symmetrical shape, and has a part having a radius different along an axis of said rotationally symmetrical shape;

said antenna apparatus is disposed in a vehicle cabin for receiving radio waves from a transmitter mounted in a wheel;

said transmitter comprises respective transmitters mounted in respective wheels; and said antenna apparatus is disposed at a position of a vehicle body roof part approximately equidistant from the respective wheels in such a manner that a head part of the antenna element faces vertically downward.

7. The antenna apparatus as claimed in claim 6, transmitting radio waves to trigger a predetermined transmitting operation to a transmitter mounted in an underbody part of a vehicle.

8. The antenna apparatus as claimed in claim 7, wherein:

said transmitter is mounted on a wheel, and said predetermined transmitting operation comprises an operation of transmitting an ID number of said transmitter.

* * * * *